(12) United States Patent
Mitchell

(10) Patent No.: US 11,765,118 B1
(45) Date of Patent: Sep. 19, 2023

(54) SELECTIVE POSTING FOR SOCIAL NETWORKS

(71) Applicant: Intuit Inc., Mountain View, CA (US)

(72) Inventor: Michael William Mitchell, Santa Cruz, CA (US)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 18/140,480

(22) Filed: Apr. 27, 2023

(51) Int. Cl.
    *H04L 51/222* (2022.01)
    *H04L 51/52* (2022.01)

(52) U.S. Cl.
    CPC ............ *H04L 51/222* (2022.05); *H04L 51/52* (2022.05)

(58) Field of Classification Search
    CPC .............................. H04L 51/222; H04L 51/52
    See application file for complete search history.

(56) References Cited

U.S. PATENT DOCUMENTS

| | | | |
|---|---|---|---|
| 8,775,328 B1 | 7/2014 | Abhyanker | |
| 9,426,231 B2 | 8/2016 | Yoshikawa et al. | |
| 10,255,358 B2 | 4/2019 | Green | |
| 10,755,364 B2 | 8/2020 | Karroum | |
| 11,122,009 B2 | 9/2021 | Gurevich et al. | |
| 11,290,412 B2 | 3/2022 | Blue et al. | |
| 2009/0198666 A1* | 8/2009 | Winston | G06Q 50/01 707/999.005 |
| 2015/0373489 A1* | 12/2015 | Li | H04W 4/21 455/456.1 |
| 2016/0148264 A1 | 5/2016 | Winstanley et al. | |
| 2017/0046390 A1 | 2/2017 | Jain et al. | |

FOREIGN PATENT DOCUMENTS

WO    WO-2005057977 A1 *   6/2005  ............. H04W 4/06

* cited by examiner

*Primary Examiner* — Austin J Moreau
(74) *Attorney, Agent, or Firm* — Paradice & Li LLP

(57) ABSTRACT

This disclosure relates to systems and methods for providing user content on a social network. In some aspects, the social network receives, over a communications network from a first computing device associated with a first user of the social network, a transmission including a post to be published on the social network. The social network detects, in the post, goods or services sought or inquired about by the first user, and determines a proximity of the first user. The social network identifies one or more other users of the social network located within a geographical area or the proximity associated with the first user, and presents the post only to the one or more identified users of the social network.

16 Claims, 8 Drawing Sheets

SELECTIVE POSTING FOR SOCIAL NETWORKS

TECHNICAL FIELD

This disclosure generally relates to social networks, and more specifically, to selectively delivering a post from a first user to one or more other users of the social network.

DESCRIPTION OF RELATED ART

A social network allows its users to interact with each other via a corresponding social network website. The social network typically receives demographic information, attributes, personal interests, and the like from each user to create and store a user profile for the respective user in a database associated with the social network. The social network may store relationships and/or connections between various users of the social network, and may provide a forum (e.g., wall posts, comments, picture and video sharing, event organization, messaging, games, and advertising, among other examples) to facilitate social interaction between the users. The social network may provide content, messages, advertising, and other services to users that are registered with the social network.

A user can execute a browser or software application (an "App") residing on a computing device (e.g., a computer, tablet, or smartphone, among other examples) to access the social network, to view the user's profile page, to view other users' profile pages, and to publish posts (e.g., text, images, or videos, among other examples) that can be shared with or viewed by other users of the social network. In some instances, a user may want to inquire other users about certain goods or services sought by the user. For example, the user may be looking for a babysitter, a nanny, or a landscaper, and may wish to see if any of his or her connections offers such services or can recommend someone who provides such services.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter. Moreover, the systems, methods, and devices of this disclosure each have several innovative aspects, no single one of which is solely responsible for the desirable attributes disclosed herein.

One innovative aspect of the subject matter described in this disclosure can be implemented as a method for providing user content on a social network. The method can be performed by one or more processors of a server hosting the social network, and includes receiving a transmission over a communications network from a first computing device associated with a first user of the social network, the transmission including a post indicating one or more goods or services sought by the first user. The method includes determining that the post indicates the goods or services sought by the first user and determining a location of the first user based at least in part on the received transmission. The method includes identifying one or more other users of the social network who are located within a geographical area associated with the first user, and transmitting the post over the communications network only to computing devices associated with the one or more identified users of the social network. In some instances, the method also includes presenting the post on respective user interfaces of the computing devices associated with the one or more identified users. In various aspects, the post is presented on the respective user interfaces of the computing devices independently of an online marketplace associated with the social network.

The location of a respective user can be based on the IP address of a computing device used by the respective user, positioning information of a mobile device used by the respective user to access the social network, or a location specified by the respective user. In some instances, the geographical area can be based on one or more of a distance from the first user, a travel time to the first user, an area code of the first user, a zip code of the first user, or a time zone of the first user. In some aspects, the geographical area may be specified by the first user. In other aspects, the geographical area may be selected by the social network system, for example, to ensure that the geographical area includes a minimum number of other users.

In some implementations, the method may also include obtaining one or more ideologies, beliefs, or personal attributes of the first user, and determining a level of similarity between each of the one or more ideologies, beliefs, or personal attributes of the first user and a corresponding ideology, belief, or personal attribute of each of the one or more identified users. The method may also include assigning a similarity score to each identified user based on the determined level of similarity for the respective identified user. The method may also include selecting each of the one or more identified users whose similarity score is greater than a threshold score, and presenting the post only to the selected users of the one or more identified users. In some instances, the method may also include presenting, on a display screen of the first computing device, the selected users in an arrangement indicative of their respective similarity scores. In some aspects, the arrangement includes one or more concentric rings each corresponding to a respective selected user, the one or more concentric rings ordered based on the similarity scores of the respective selected users.

Another innovative aspect of the subject matter described in this disclosure can be implemented in a system for providing user content on a social network. The system may include one or more processors and a memory communicatively coupled with the one or more processors. The memory stores instructions that, when executed by the one or more processors, causes the system to perform a number of operations. In some instances, the operations include receiving a transmission over a communications network from a first computing device associated with a first user of the social network, the transmission including a post indicating one or more goods or services sought by the first user. The operations include determining that the post indicates the one or more goods or services sought by the first user and determining a location of the first user based at least in part on the received transmission. The operations include identifying one or more other users of the social network who are located within a geographical area associated with the first user, and transmitting the post over the communications network only to computing devices associated with the one or more identified users of the social network. In some instances, the operations also include presenting the post on respective user interfaces of the computing devices associated with the one or more identified users. In various aspects, the post is presented on the respective user interfaces of the computing devices independently of an online marketplace associated with the social network.

The location of a respective user can be based on the IP address of a computing device used by the respective user, positioning information of a mobile device used by the respective user to access the social network, or a location specified by the respective user. In some instances, the geographical area can be based on one or more of a distance from the first user, a travel time to the first user, an area code of the first user, a zip code of the first user, or a time zone of the first user. In some aspects, the geographical area may be specified by the first user. In other aspects, the geographical area may be selected by the social network system, for example, to ensure that the geographical area includes a minimum number of other users.

In some implementations, the operations may also include obtaining one or more ideologies, beliefs, or personal attributes of the first user, and determining a level of similarity between each of the one or more ideologies, beliefs, or personal attributes of the first user and a corresponding ideology, belief, or personal attribute of each of the one or more identified users. The operations may also include assigning a similarity score to each identified user based on the determined level of similarity for the respective identified user. The operations may also include selecting each of the one or more identified users whose similarity score is greater than a threshold score, and presenting the post only to the selected users of the one or more identified users. In some instances, the operations may also include presenting, on a display screen of the first computing device, the selected users in an arrangement indicative of their respective similarity scores. In some aspects, the arrangement includes one or more concentric rings each corresponding to a respective selected user, the one or more concentric rings ordered based on the similarity scores of the respective selected users.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
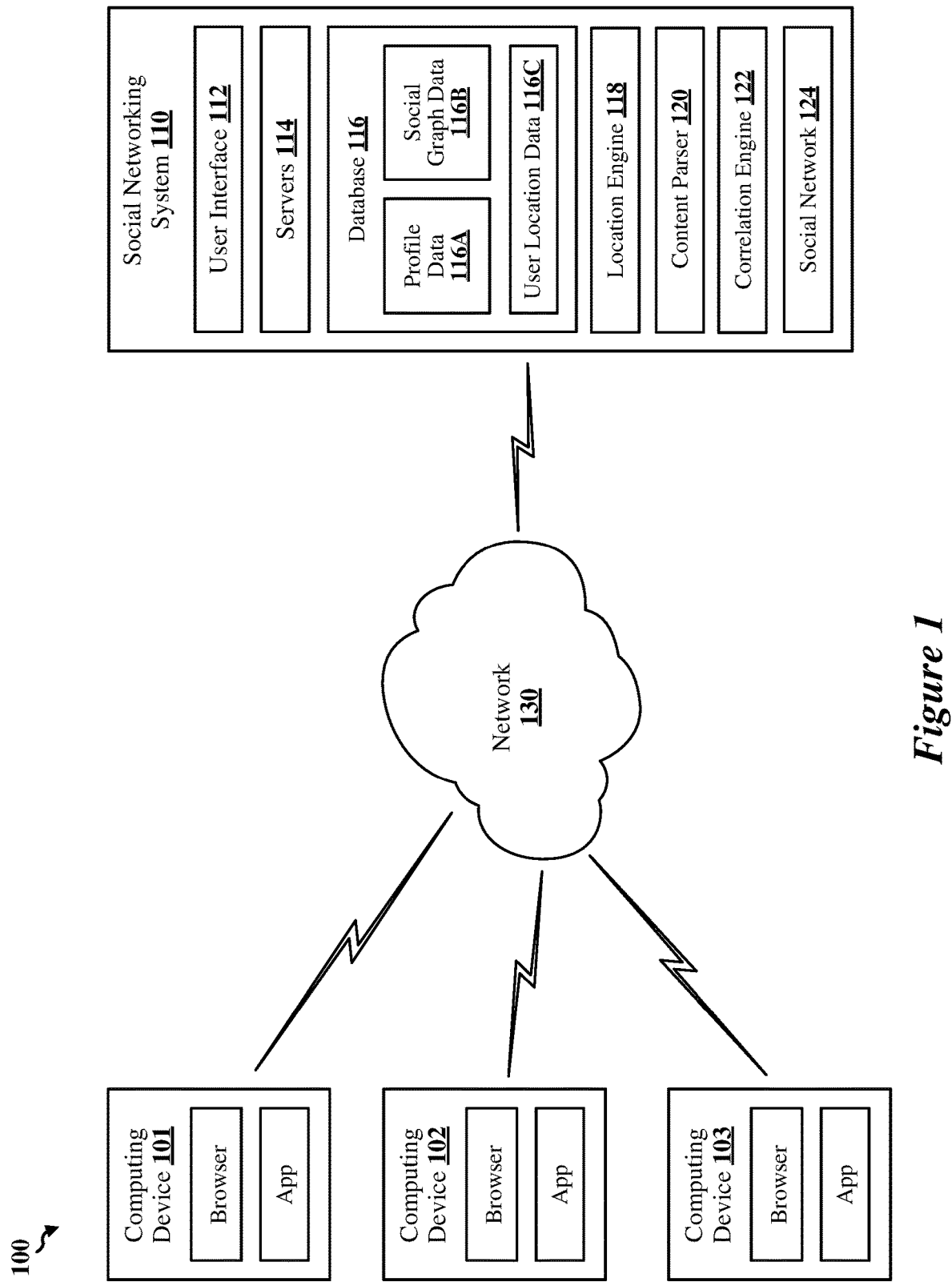
FIG. 1 shows an example network environment associated with a social network, according to some implementations.

Implementations of the subject matter described in this disclosure can be used to provide user content on a social network. As described above, social networks typically allow users to post data (e.g., text, images, or videos) and to share the data with other users of the social network. Some social networks may share a user's post only with other users who have a connection with the user. In some instances, a user of a social network may want to inquire other users of the social network about certain goods or services sought by the user. For example, the user may be looking for a babysitter, and may inquire via a post if any of the user's connections provides babysitting services (or can recommend someone who provides babysitting services). If the user's connections are spread across a large geographic area (e.g., across a state or country), the user may not want to receive responses to the post from other users who are located too far away from the user to provide babysitting services. Rather, the user may want to consider only babysitters who live within a certain geographic area associated with the user (e.g., within a specified distance or travel time), and therefore may want to restrict delivery, viewing, or access to the post to other users who are located within the certain geographic area associated with the user. As used herein, goods and services may refer to any goods, services, or other items, both tangible and intangible, that provide utility in satisfying human needs or desires. In some aspects, the services can include notifications such as narrowcasting a warning to users within a proximity of a natural disaster.

In accordance with various aspects of the present disclosure, a social network can geographically restrict access to posts in which a first user of the social network seeks goods or services from other users of the social network. The goods or services can be any suitable product or service that can be provided or recommended by the other users of the social network. For example, the post may indicate that the first user is looking for a babysitter for a particular weekend, that the first user is looking for other users to play tennis with on Tuesday afternoons, or that the first user is looking for a landscaper, among other examples. In some implementations, the social network can parse content in the post to determine that the first user is looking for goods or services that can be provided by other users of the social network, and can restrict delivery of or access to the post to other users who are located within a geographic area of the first user. The geographic area may be based on one or more of a distance to the first user, a travel time to the first user, an area code of the first user, a zip code of the first user, or a time zone of the first user, among other examples. In some aspects, the geographic area may be specified by the user, while in other aspects, the geographic area may be determined by the social network. By delivering the first user's post only to other users who are located within the geographic area associated with the first user, aspects of the present disclosure may ensure that the first user receives responses to the post seeking goods or services only from other users who are located close enough to the first user to be able to conveniently, or at least practically, provide the goods or services sought by the first user. In this way, aspects of the present disclosure may reduce or even eliminate the number of responses to such posts from other users who cannot provide the goods or services because they are too far from the first user.

Aspects of the subject matter disclosed herein are not an abstract idea such as a mental process that can be performed in the human mind, for example, because the human mind is not capable of implementing an online social network that can geographically restrict posts in which users of the social network inquire other users of the social network about goods and services. Indeed, the human mind is neither equipped to nor capable of receiving posts from users over a communications network. Similarly, the human mind is neither equipped to nor capable of delivering such posts to other users of the social network over the communications network. Aspects of the subject matter disclosed herein are not an abstract idea such as a method of organizing human activity because the claims of this patent application do not recite any fundamental economic practice, commercial interaction, legal interaction, or business relations. Moreover, various aspects of the present disclosure provide a technical solution to a technical problem rooted in technology, namely, restricting access to posts seeking goods or services to users who are located within a specified geographic area of the posting user.

In the following description, numerous specific details are set forth such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the aspects of the disclosure. However, it will be apparent to one skilled in the art that these specific details may not be required to practice the example implementations. In other instances, well-known circuits and devices are shown in block diagram form to avoid obscuring the present disclosure. Some portions of the detailed descriptions which follow are presented in terms of procedures, logic blocks, processing, and other symbolic representations of operations on data bits within a computer memory.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. Also, the example input devices may include components other than those shown, including well-known components such as a processor, memory, and the like.

Several aspects of electronic payment services will now be presented with reference to various apparatus and methods. These apparatus and methods will be described in the following detailed description and illustrated in the accompanying drawings by various blocks, components, circuits, devices, processes, algorithms, and the like (collectively referred to herein as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example implementations, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 shows an example network environment 100 associated with a social network, according to some implementations. The network environment 100 is shown to include three computing devices 101-103, a social network system 110, and a communications network 130. As used herein, the first computing device 101 may be associated with a first user registered with the social network system 110, the second computing device 102 may be associated with a second user registered with the social network system 110, and the third computing device 103 may be associated with a third user registered with the social network system 110 (for simplicity, users are not shown in FIG. 1). The computing devices 101-103 can be any suitable wired or wireless computing device that can access and communicate with the social network system 110 over the communications network 130. Although not shown in FIG. 1 for simplicity, each of the computing devices 101-103 includes a user interface through which a respective user can interact with one or more social networks associated with the social network system 110. For example, the user interface of a computing device allows a respective user to view posts, content, messages, services, and other information made available by the social network system 110. The user interface also allows the respective user to post content on the one or more of the social networks, to send messages to other users, and to share content with other users, among other examples. In various aspects, the user interface may include one or more of a display screen, an audio interface, a virtual reality headset, an augmented reality headset, a digital assistant, a haptic interface, a motion-detection interface, a keyboard, a trackpad, a trackball, a mouse, or a digital brain interface (DBI), among other examples.

In some instances, one or more of the computing devices 101-103 can be a desktop computer, laptop computer, tablet computer, personal digital assistant, cellular telephone, smartphone, electronic book reader, or other suitable device capable of communicating with the social network system 110. Although only three computing devices 101-103 are shown in the example of FIG. 1, in other implementations, any suitable number of computing devices can be connected to the social network system 110 over the communications network 130. In addition, although not shown for simplicity, the network environment 100 may include other computing devices, servers, interfaces, online social networks, or third-party systems, among other examples.

Each of the computing devices 101-103 may include a generic browser through which a respective user can access or login to the social network system 110 and thereafter interact with other users, share content with other users, and engage services provided on the social network system 110. Each of the computing devices 101-103 may also include one or more processors (not shown for simplicity) that can execute a software application (an "App") that allows the respective user to access the social network system 110 over the communications network 130. For example, when the App is executed by the one or more processors of computing device 101, the first user can use the App to login to the social network system 110 and thereafter share, post, message, or otherwise interact with other users of the social network and/or to take advantage of various services made available by the social network.

The social network system 110 includes a user interface 112, one or more servers 114, a database 116, a location engine 118, a content parser 120, a correlation engine 122, and a social network 124. The user interface 112 receives requests from various user computing devices (such as computing devices 101-103), and transmits appropriate responses to the requesting user computing devices over the communications network 130. For example, the user interface 112 may receive requests from user computing devices 101-103 as Hyper-Text Transfer Protocol (HTTP) requests, Application Program Interface (API) requests, or other web-based requests. After accepting an HTTP request, the user interface 112 may facilitate communications between the social network system 110 and the user computing devices 101-103 using one or more Hyper Text Markup Language (HTML) files responsive to the HTTP request. In some instances, the user interface 112 may, in conjunction with an application logic layer (not shown for simplicity), generate the HTML files as web pages that can be transmitted to the computing devices 101-103 over the communications network 130. The computing devices 101-103 may present the received HTML files as web pages to their respective users, who can interact with the web pages via the user interfaces associated with the computing devices 101-103.

The servers 114 may include various types of servers such as (but not limited to) a web server, a news server, a file server, an application server, a database server, a proxy server, or any other server suitable for performing functions or processes described herein. Each server 114 may be a unitary server or a distributed server spanning multiple computers or multiple datacenters, and may include hardware, software, or embedded logic components or a combination of two or more such components for carrying out the appropriate functionalities implemented or supported by the server 114. In some instances, each server 114 may include one or more processors (not shown for simplicity) capable of executing scripts or instructions of one or more software programs stored in an associated memory. In addition, or in the alternative, the processors may be or may include any number of Application Specific Integrated Circuits (ASICs), Field Programmable Gate Arrays (FPGAs), or Programmable Logic Devices (PLDs).

In some implementations, the servers 114 may include individual application server modules (not shown for simplicity) that can implement functionalities associated with various services and features of the social network 124. For instance, the ability of an organization to establish a presence in a social graph associated with the social network 124, to establish a customized web page on behalf of an organization, and to publish messages or status updates on behalf of an organization may be examples of services implemented by the independent application server modules. Similarly, various applications and/or services made available to users of the social network 124 can be implemented by their own respective application server modules.

The database 116 stores information pertaining to users registered or otherwise associated with the social network 124, information pertaining to connections or links between the users, user-generated content, user posts, sponsored content, advertisements, events, and other information associated with content and services provided by the social network system 110. In some instances, the database 116 can be a relational database capable of manipulating any number of various data sets using relational operators. The database 116 can also use Structured Query Language (SQL) for querying and maintaining the database, and information stored in the database 116 can be arranged in tabular form, either collectively in a feature table or individually within each of the data sets.

The database 116 may include a profile data store 116A, a social graph data store 116B, and a user location data store 116C. The profile data store 116A may store profile information for users registered with or otherwise associated with the social network 124. In various aspects, the profile data store 116A may also store profile information for one or more organizations. In some instances, when a person initially registers to become a user of the social network 124, the person may be prompted to provide personal information and/or personal attributes including (but not limited to) name, age, birthday, gender, educational history, work history, current or former employers, current or former friends, spousal information, children information, current residence, hometown, birthplace, a hobby, a special talent, interests, ideologies, beliefs, affinities, or characteristics, attributes, or facts pertaining to the person that are uniquely known to one or more other users of the social network 124, among other examples. Similarly, when a representative of an organization initially registers the organization with the social network 124, the representative may be prompted to provide certain information about the organization, which may be stored in the profile data store 116A. In some aspects, the profile information of a respective user may be processed to generate derived profile information of the respective user. For example, if a user provides information indicating various job titles that the user has held with the same company or with different companies and the duration of each job title, this information can be used to infer or derive a user attribute indicating the user's overall seniority or experience level within a particular company.

Once a user is registered with the social network 124, the user may invite other users, or be invited by other users, to establish a connection with the other users in the social network 124. In various aspects, both users must agree to establish the connection between them. For example, a first user of the social network 124 may want to establish a connection with a second user of the social network 124. The first user may use computing device 101 to send an invitation to connect (also referred to herein as a "connect invite") over the communications network 130 to the social network system 110, which in turn may forward the connect invite over the communications network 130 to computing device 102. In response thereto, the computing device 102 presents the connect invite to the second user on a user interface (such as a display screen) associated with computing device 102. The second user may accept, decline, or ignore the connect invite from the first user.

In some implementations, a user may "follow" another user. In contrast to the bi-lateral manner in which a connection is established between users, following another user is typically a unilateral operation that does not require acknowledgement or approval by the other user (the "followed" user). Users that follow ("following" users) other users can receive messages, status updates, or other content provided by the followed user. Similarly, when a user follows an organization, the user may receive messages, status updates, or other content provided by the organization. In some aspects, messages and status updates published on behalf of a followed organization can be presented in the following users' feed, wall, or content stream. The various associations and relationships that users of the social network 124 establish with one another, including connections and followings, can be stored in one or more social graphs.

The social graph data store 116B may store one or more social graphs indicating the relationships, associations, connections, and followings between various users, organizations, and other third-party entities associated with the social network 124. In some instances, the social graphs include a plurality of user nodes that are selectively connected to one another by multiple edges, where each user node corresponds to a respective user of the social network 124 and each edge corresponds to a relationship, association, or connection between a pair of users of the social network 124. For example, when a first user and a second user establish a connection between them, the social graph stored in the social graph data store 116B can be updated to include a connection edge between the user nodes associated with the first and second users.

The user location data store 116C stores location or position information of users associated with the social network 124. In various implementations, the user location data store 116C can store location information for each device used by a respective user to access or login to the social network 124. For example, the user location data store 116C can store the location of a stationary computing device (e.g., a desktop computer or workstation) with which the respective user has logged into the social network 124, and can also store the locations of one or more mobile communication devices (e.g., a smartphone, tablet computer, laptop computer, or other wireless communication device) with which the respective user has logged into the social network 124.

The location engine 118 can determine the locations or positions of computing devices with which users of the social network 124 use to login to or otherwise access the social network 124. The location engine 118 can determine the location of a stationary computing device based on information carried in communications transmitted from the stationary computing device such as (but not limited to) the Internet Protocol (IP) address and/or the medium access control (MAC) address associated with the computing device. The location engine 118 can determine the location of a mobile communication device based on information carried in communications transmitted from the mobile communication device such as (but not limited to) the MAC address of the mobile communication device, an Association Identification (AID) value assigned to the mobile communication device by a wireless local area network (WLAN), a user equipment identity (UEID) assigned to the mobile communication device by a cellular network, or a device ID assigned to the mobile communication device by a personal area network (PAN), among other examples. In some instances, the location engine 118 can obtain positioning information (e.g., GPS, GNSS, or other satellite coordinates) from the mobile communication device. In other instances, a user can provide the location of a corresponding mobile communication device (or stationary computing device).

The content parser 120 can parse content provided, published, and/or posted on the social network 124 into a plurality of segments (e.g., words, phrases, or sentences, among other examples) that can be searched using one or more search terms. Specifically, when a user provides or submits a post to the social network 124, the content parser 120 parses the text, pictures, icons, and other content of the post into segments that can be searched for the presence of one or more predetermined words, phrases, sentences, or acronyms indicating that the user is seeking goods or services that can be provided by other users of the social network 124. For example, in some aspects, the content parser 120 can be programmed, configured, or trained to determine whether a respective post seeks, identifies, or otherwise mentions any goods or services and, if so, to determine whether the user who created the respective post is seeking other users of the social network who can provide such goods or services.

In some instances, the content parser 120 can be programmed or configured to take certain actions and/or perform certain operations based on the presence of one or more predetermined words, phrases, sentences, acronyms in the post. For example, when the content parser 120 determines that a post indicates goods or services sought by a first user of the social network 124 from other users of the social network 124, the social network system 110 can geographically restrict access to the post, for example, by delivering or sharing the post only with other users who are located within a specified geographic area of the first user. Although the content parser 120 is depicted as a separate, single component of the social network system 110, the content parser 120 may include additional components, may include processor-executable instructions stored in the database 116, may include application specific hardware (e.g., one or more ASICs), or any combination thereof.

The correlation engine 122 can correlate one or more of the ideologies, beliefs, or personal attributes of a first user with corresponding ideologies, beliefs, or personal attributes of other users to identify or determine similarities between the first user and the other users. For example, in some instances, the correlation engine 122 can determine the correlation or level of similarity between one or more personal attributes of the first user and one or more corresponding personal attributes of a group of other users. The personal attributes of a respective user may include (but are not limited to) one or more of an educational history, a work history, current or former employers, current or former friends, a current residence, a hobby, a special talent, a distinguishing feature or birthmark, a favorite interest, song, movie, quote, or joke, or one or more characteristics, interests, or facts pertaining to the first user that are uniquely known to at least one of the other users. For example, the correlation information may identify users who have similar or common work experiences, employers, job titles, and/or educational backgrounds. For another example, the correlation information may identify users who have similar or common hobbies, interests, and/or talents. For another example, the correlation information may identify users who have similar or common ideologies, beliefs, and/or affinities. In other instances, the correlation information may identify users who have the most dissimilar characteristics, demographics, experiences, hobbies, interests, favorites, talents, and the like. In some aspects, the correlation information may identify users who have the most dissimilar or opposing points of view, ideologies, or beliefs, for example, to facilitate a lively discussion or debate with the first user.

In some implementations, the correlation engine 122 can assign a similarity score to each of the other users based on their correlation or level of similarity with the first user, and then rank, position, or otherwise order the other users according to their similarity scores. In some instances, the other users can be ordered such that the user who has the highest similarity score may be presented first or most prominently to the first user, and the user who has the lowest similarity score may be presented last or least prominently to the first user. In some instances, the correlation engine 122 can present the other users in an arrangement indicative of their respective similarity scores on a display screen of computing device 101, for example, so that the first user can determine whether any of the other users who can provide the goods or services indicated in the post share one or more similar ideologies, beliefs, or personal attributes with the first user.

In some aspects, the arrangement may include a plurality of concentric rings of increasing diameters that encircle a center area (e.g., similar to a "bullseye"), where each concentric ring corresponds to a respective other user and the ordering of the concentric rings is based on the similarity scores of the respective other users. For example, the center area may correspond to the first user, the inner-most concentric ring may correspond to the other user who has the highest similarity score, the next inner-most concentric ring may correspond to the other user who has the next-highest similarity score, and so on, where the outer-most concentric ring may correspond to the user who has the lowest similarity score.

The social network 124 may provide a broad range of other applications and services that allow users the opportunity to share and receive information. In some aspects, the social network 124 may provide information that is customized to the interests of the respective users. For example, in some instances, the social network 124 may include a photo sharing application that allows users to upload and share photos with other users. The users may be able to self-organize into groups based on common interests, beliefs, or other personal attributes. In some instances, the social network 124 may host various job listings providing details of job openings with various organizations. In some aspects, the social network system 110 may allow users to take actions on various types of items or objects including (but not limited to) groups or social networks to which users of the social network 124 belong, events or calendar entries in which users may be interested, computer-based applications available to the users, transactions that allow users to buy or sell goods and services through the social network 124, and interactions with advertisements, among other examples.

Although not shown for simplicity, the social network 124 may be associated with a third-party content provider that can provide, to various users or groups of users, content such as (but not limited to) movie show times, movie reviews, restaurant reviews, restaurant menus, product information and reviews, recommendations or likes of other users, coupons, discount tickets, or gift certificates, among other examples. The social network 124 may also include user-generated content (such as links and posts) that can enhance a respective user's interactions with the social network 124. For example, a user can transmit a post to the social network 124 from a corresponding computing device, and the social network 124 can publish the post on user walls, user feeds, newsfeeds, streams, or other suitable pages or channels associated with users of the social network 124. In some instances, the social network 124 can publish a post by transmitting the post to computing devices associated with one or more users (or one or more groups of users). In some aspects, the social network 124 can present posts to a group of users as push notifications displayed on the user interfaces of computing devices 101-103. As used herein, posts may include status updates, textual data, location information, photos, videos, links, music, or other suitable information, media, or files. In some aspects, a third-party can add content may to the social network 124 using a newsfeed, stream, or other suitable communication channel.

The communications network 130 provides communication links between the social network system 110 and each of the computing devices 101-103. The communications network 130 can be any suitable one or more communication networks including, for example, the Internet, a wide area network (WAN), a metropolitan area network (MAN), a wireless local area network (WLAN), a personal area network (PAN) such as Bluetooth®, a portion of the Public Switched Telephone Network (PSTN), a cellular telephone network, a radio access network (RAN) such as a Fifth Generation (5G) New Radio (NR) system, an Ethernet network, a cable network, a satellite network, or any combination thereof.

Figure 2:
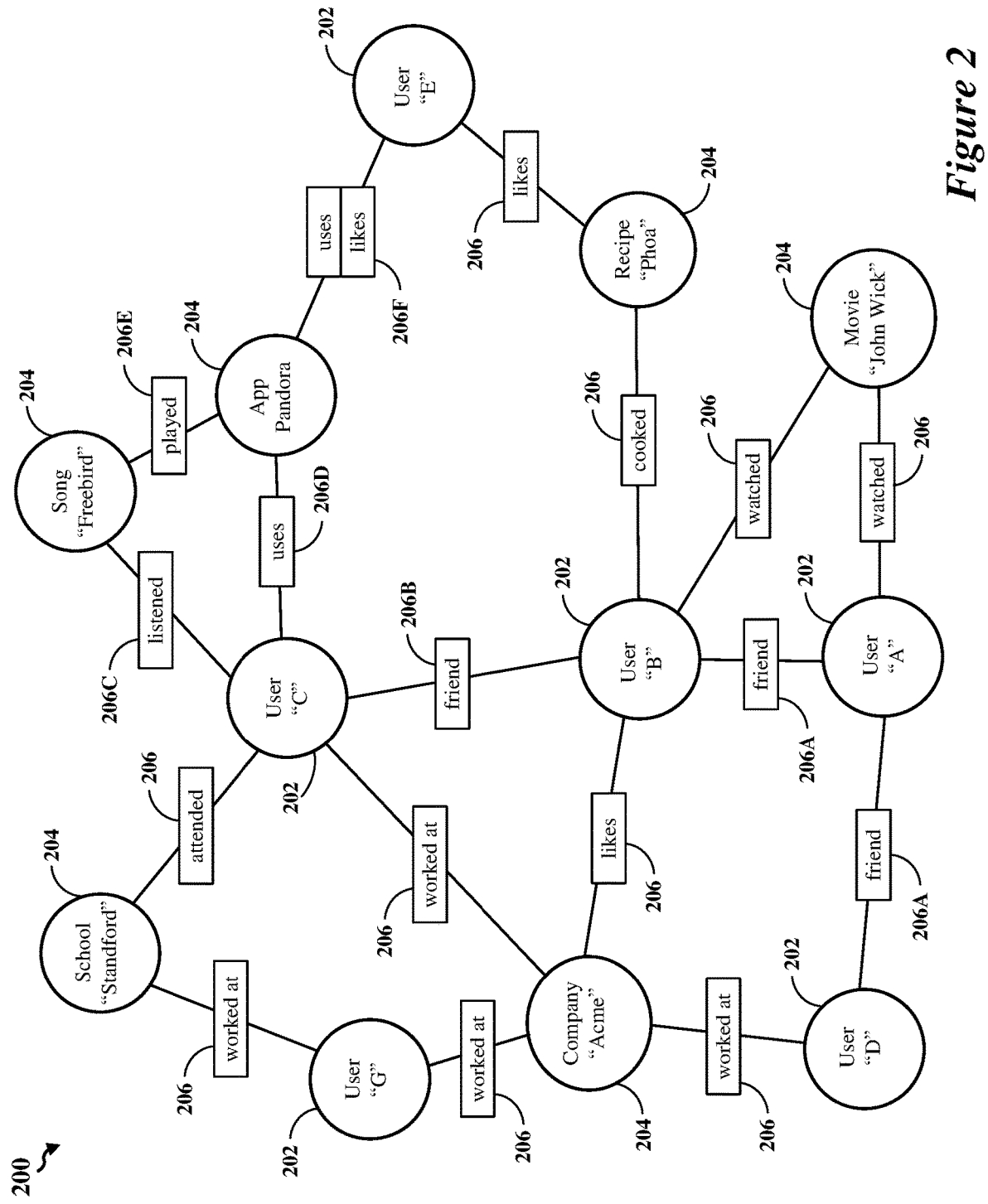
FIG. 2 shows an example social graph, according to some implementations.

FIG. 2 shows an example social graph 200, according to some implementations. The social graph 200 may include a plurality of user nodes 408 and subject nodes 204 that are selectively connected to one another by multiple edges 206. Each user node 202 may be associated with a respective user of the social network 124, and each subject node 204 may be associated with a respective subject of the social network 124. When a new user registers with the social network 124, the social network system 110 may create a user node 202 for the new user, and may store the user node 202 in the social graph data store 116B as part of the social graph 200. In some instances, the user nodes 202, subject nodes 204, and edges 206 of the social graph 200 may be stored as data objects from which one or more searchable indexes of nodes or edges can be created and used to identify connections between users of the social network 124.

A pair of nodes in the social graph 200 may be connected to each other by one or more edges 206. An edge 206 connecting a pair of nodes may represent a relationship between the pair of nodes. In some instances, an edge 206 may indicate one or more data objects or attributes corresponding to the relationship between a pair of nodes. For example, when a first user and a second user establish a connection, the social network system 110 may create an edge 206 connecting a first user node 202 associated with the first user to a second user node 202 associated with the second user, and then store the edge 206 in the social graph data store 116B as part of the social graph 200. In the example of FIG. 2, the social graph 200 includes an edge 206A indicating a friend relationship between the user nodes 202 associated with user A and user B, and includes an edge 206B indicating a friend relationship between the user nodes 202 associated with user B and user C. Other edges 206 of the social graph 200 may indicate other types of connections between users of the social network 124 including, for example, a family relationship, a business or employment relationship, an activity relationship, a "likes" relationship, a "following" relationship, or a subscriber relationship, among other examples.

In some instances, an edge 206 between a user node 202 and a subject node 204 may represent a particular action or activity performed by the user associated with the respective user node 202 in conjunction with the subject associated with the respective subject node 204. For example, a user may "like," "attended," "played," "listened," "cooked," "worked at," or "watched" a subject. For another example, user C may listen to the song "Freebird" using the Pandora App. In response thereto, the social network system 110 may create a "listened" edge 206C and a "used" edge 206D between the user node 202 corresponding to user C and the subject node 204 corresponding to the song "Freebird" and the Pandora App to indicate that user C listened to the song and used the application. In some aspects, the social network system 110 may also create a "played" edge 206E between the subject node 204 corresponding to the song "Freebird" and the Pandora App to indicate that the particular song was played by the particular application. Although the edges 206 described herein represent a single relationship, any one or more of the edges 206 of the social graph 200 can represent multiple relationships. For example, an edge 206 may indicate that a particular user likes and has used a particular subject. In some implementations, the correlation engine 122 described with respect to FIG. 1 can use the connections and relationships associated with the edges between user nodes of the social graph maintained in the social graph data store 116B when determining one or more levels of correlation between the users of the social network 124.

In some instances, a subject node 204 may correspond to a location or place, a website, an entity, content, an activity, an ideology, a belief, or an attribute, among other examples. For example, the location may correspond to a city, restaurant, park, or landmark, among other examples; the entity may correspond to a person, business, group, or sports team, among other examples; and the content may correspond to a photo, video file, document, movie, game, song, or application, among other examples. In other instances, a subject node 204 may represent content provided by a third-party system or application. For example, the content may be a webpage or resource hosted by the third-party system or application.

Figure 3A:
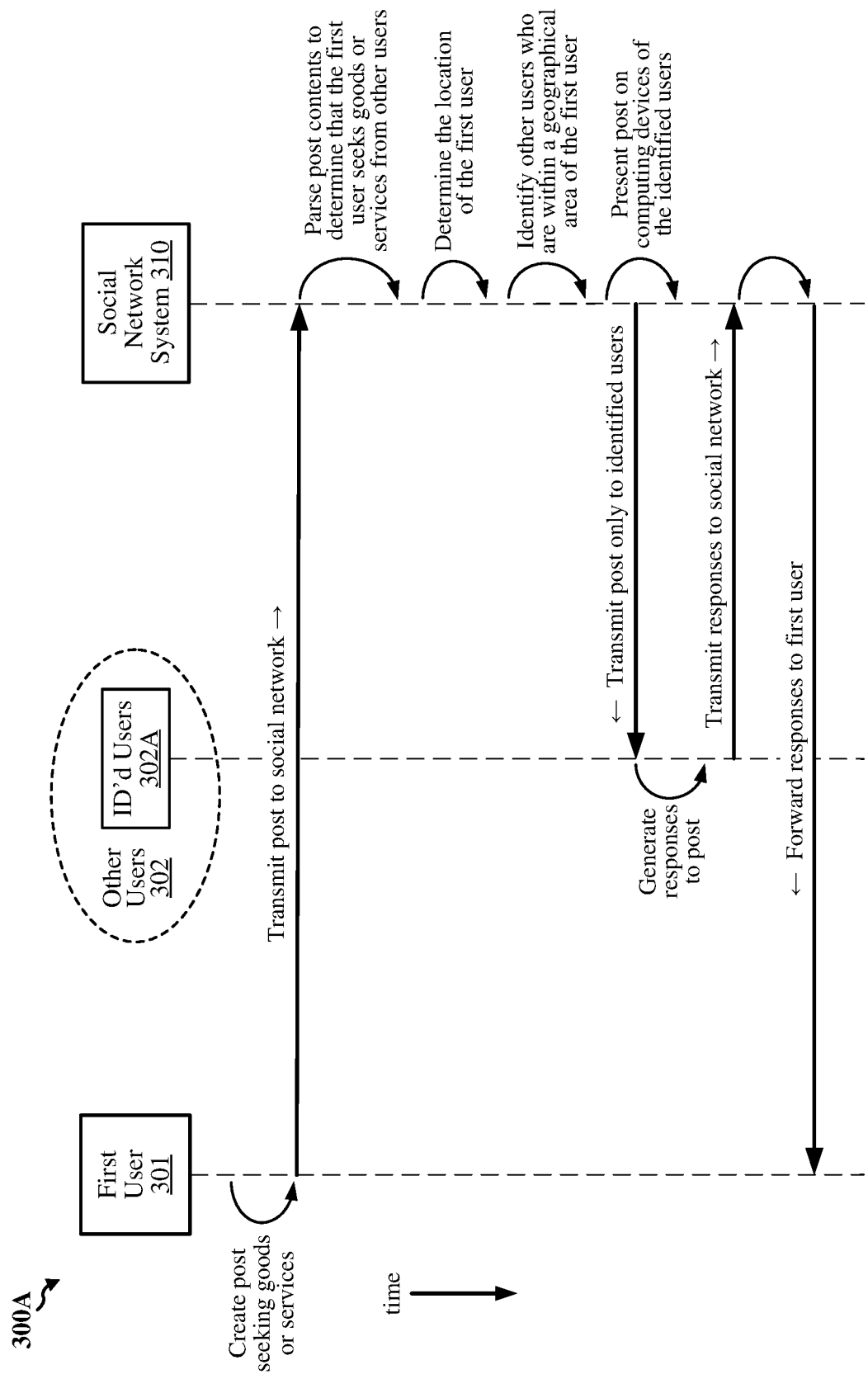
FIG. 3A shows a sequence diagram depicting an example operation for providing user content on a social network, according to some implementations.

FIG. 3A shows a sequence diagram depicting an example operation 300A for providing user content on a social network, according to some implementations. The example operation 300A may be performed between a first user 301 and one or more other users 302 of a social network system 310. In some instances, the social network system 310 may be one example of the social network system 110 of FIG. 1 and may include one or more instances of the social network 124 of FIG. 1. In the example of FIG. 3A, the first user 301 is associated with computing device 101 of FIG. 1, and the other users 302 are associated with other corresponding computing devices (such as computing devices 102-103 of FIG. 1). Thus, the first user 301 can use computing device 101 to log into, access, and interact with other users, content, services, and other features of the social network system 310 over the communications network 130, and the other users 302 can use their respective computing devices to login to, access, and interact with other users, content, services, and other features of the social network system 310 over the communications network 130.

The operation 300A begins with the first user 301 creating a post in which the first user 301 inquires as to whether some of the other users 302 of the social network system 310 can provide or recommend one or more goods or services to the first user 301. The first user 301 transmits the post over the communications network 130 to the social network system 310 using computing device 101. The post is received by the social network system 310, and the content parser 120 parses the post to determine that the first user 301 is seeking the one or more goods or services from the other users 302 of the social network system 310. As discussed, the content parser 120 can parse the content of the post into a plurality of segments (e.g., words, phases, sentences, and acronyms, among other examples) that can be searched to determine that the post identifies or mentions one or more goods or services and that the first user 301 is seeking the one or more goods or services from the other users 302.

In some implementations, the content parser 120 can compare the segments obtained from the post with a plurality of search terms or search strings to determine whether the post indicates one or more goods or services sought by the first user 301 from some of the other users 302. In other implementations, the content parser 120 can use optical-character recognition (OCR) techniques to generate machine-readable text indicative of the content of the post. Natural language processing (NLP) techniques can be applied to the character string to identify words, sentences, and other information from the machine-encoded text. In some instances, the content parser 120 may also obtain one or more additional details pertaining to the first user 301 and/or the goods and services from the post. The one or more additional details may include (but are not limited to) information such as the location of the first user, the location at which the identified goods or services are to be delivered, the location at which the identified services are to be performed, a proposed time, preferences, and the like.

The social network system 310 determines the location of the first user 301 based at least in part on the transmission carrying the post from the first user 301. In some instances, the social network system 310 determines the location of the first user 301 while the content parser 120 parses the post. For example, in some aspects, the first user's location can be determined using the IP address and/or the MAC address associated with computing device 101. In other aspects, the first user's location can be determined using positioning information provided by a mobile communication device associated with the first user 301 (such as a cell ID assigned by a base station or core network entity associated with a cellular network). In some other aspects, the first user 301 can provide location information in the post.

Once the location of the first user 301 is determined, the social network system 310 identifies one or more of the other users 302 of the social network system 310 who are located within a geographical area associated with the first user 301. In some instances, the geographical area may be based on one or more of a distance to the first user, a travel time to the first user, an area code of the first user, a zip code of the first user, or a time zone of the first user, among other examples. For example, if the first user 301 lives in San Jose, California and is looking for a babysitter, the geographical area may be based on a maximum distance or travel time that is convenient or practical for the other users 302 to provide babysitting services. For example, although the first user 301 may be interested in babysitters who live nearby in Campbell, California due to the relatively short distance or travel time between Campbell and San Jose, the first user 301 may not be interested in babysitters who live in Sacramento, California, because the distance and travel time between San Jose and Sacramento would make it difficult, if not impossible, for other users who live in Sacramento to provide babysitting services in San Jose.

In some aspects, the geographic area may be specified or otherwise indicated by the first user 301 in the post. For example, the first user 301 may specify in the post that he or she is looking for a tennis partner that also lives in Los Gatos, or may specify that he or she is looking for a chiropractor within 10 miles of Los Gatos. For another example, the first user 301 may specify in the post that he or she is looking for an online gaming player who is also located in the Pacific time zone. In other aspects, the geographic area may be determined by the social network system 310. For example, if the first user 301 does not specify a geographic area, the social network system 310 may determine a suitable geographic area for the first user 301. In some other aspects, the social network system 310 may define the shape and/or size of geographic area such that a minimum number of other users 302 are located within the geographic area, for example, to provide the first user 301 with a certain number of other users 302 from which to choose as providers of the goods or services indicated in the post.

After identifying the other users 302A who are located within the geographic area of the first user 301, the social network system 310 delivers the post only to the identified users 302A. In the example of FIG. 3A, the identified users 302A who are located within the geographic area of the first user 301 are depicted as a subset of the other users 302 of the social network system 310. Specifically, the social network system 310 transmits the post over the communications network only to the computing devices associated with the identified users 302A. These computing devices may present the first user's post on their respective user interfaces for viewing by the identified users 302A. In this way, the social network system 310 may allow the first user's post to be delivered to and accessed by only the identified users 302A who are located within the geographic area associated with the first user 301.

The post may be presented to the identified users 302A via their respective user interfaces (such as a display screen) independently of an online marketplace associated with the social network system 310. In some instances, the first user's post may be presented to the identified users 302A on the user interfaces of their respective computing devices in the same manner that other posts (e.g., posts that do not seek goods or services) are presented. For example, in some aspects, the post may be presented in a general feed, wall, or stream associated with each of the identified users 302A. Because online marketplaces can be loosely organized, prone to clutter, littered with advertisements, and cumbersome to navigate, the ability of social network system 310 to present the first user's post to the identified users 302A without using online marketplaces may increase the ease and convenience with which the identified users 302A are able to receive and respond to user posts seeking goods or services from other users 302 of the social network system 310, thereby increasing the likelihood that the first user 301 receives a response to his or her post.

If an identified user 302A who views the first user's post wants to provide the goods and services sought by the first user in the post, the identified user can generate a response to the post and transmit the response over the communications network to the social network system 310. In various aspects, a respective identified user 302A may transmit a response to the first user's post over the communications network to the social network system 310, which forwards the response over the communications network to computing device 101 associated with the first user 301. The response may be transmitted as a post, a message, an email, or any other suitable form of electronic communication that can be received and viewed by the first user 301.

Figure 3B:
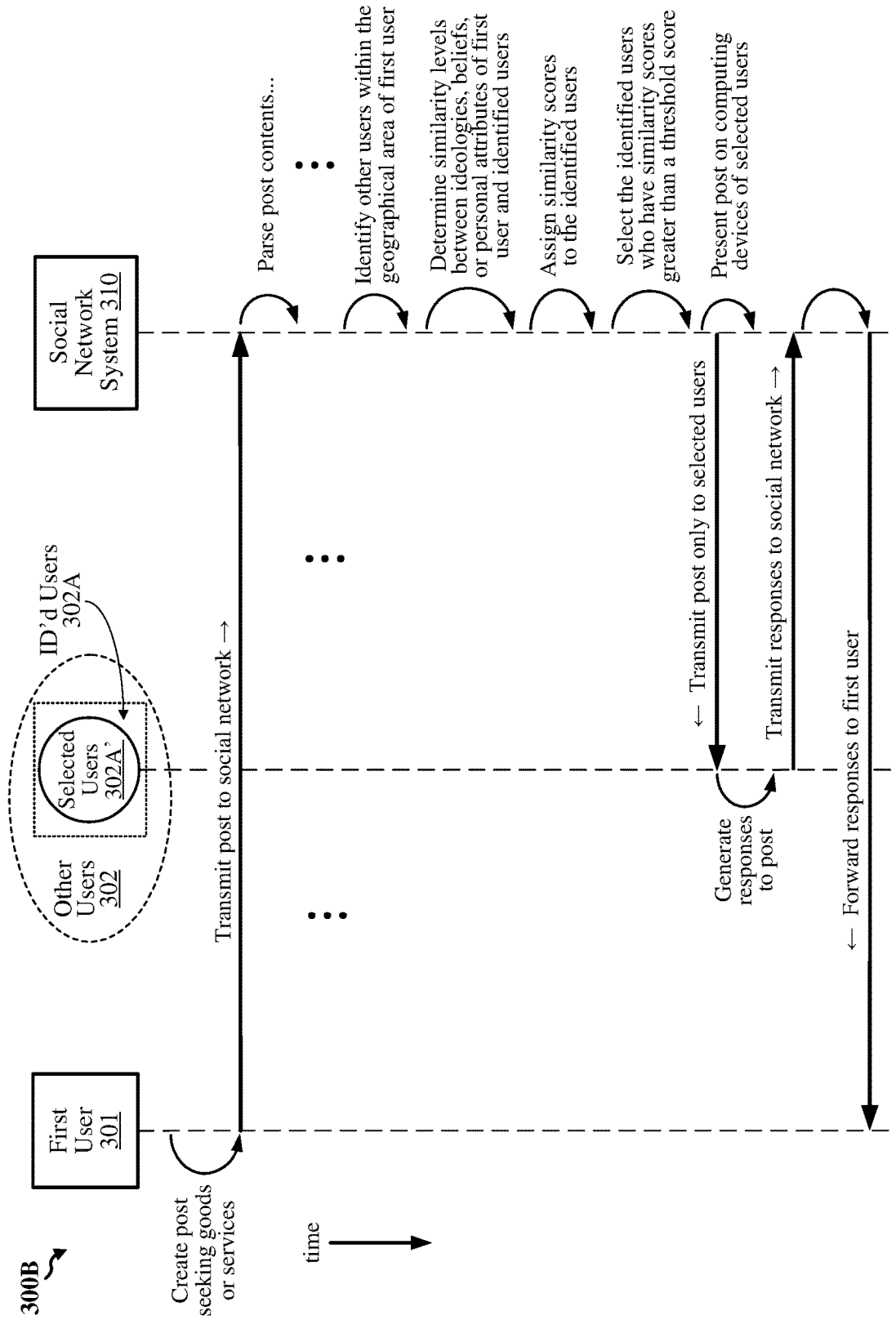
FIG. 3B shows a sequence diagram depicting another example operation for providing user content on a social network, according to other implementations.

FIG. 3B shows a sequence diagram depicting another example operation 300B for providing user content on a social network, according to some implementations. The example operation 300B may be performed between the first user 301 and the other users 302 of the social network system 310 described with respect to FIG. 3A. In some instances, the social network system 310 may be one example of the social network system 110 of FIG. 1 and may include one or more instances of the social network 124 of FIG. 1. As discussed, the first user 301 can use computing device 101 to login to, access, and interact with users, services, and other features of the social network system 310 over the communications network 130, and the other users 302 can use their respective computing devices to login to, access, and interact with users, services, and other features of the social network system 310 over the communications network 130. In some implementations, the social network system 310 may obtain and store the ideologies, beliefs, and personal attributes of the first user 301 in the profile data store 116A, and may obtain and store the respective ideologies, beliefs, and personal attributes of the other users 302 in the profile data store 116A. For example, in some instances, the ideologies, beliefs, and personal attributes of each user may be obtained by the social network system 310 during user registration.

As in the example of FIG. 3A, the operation 300B begins with the first user 301 creating the post in which the first user 301 seeks one or more goods or services that can be provided by other users 302 of the social network system 310, and continues with parsing the content of the post to determine that the first user 301 seeks the one or more goods or services from the other users 302, determining a location of the first user 301, and identifying other users 302 who are located within a geographical area associated with the first user 301. In the example of FIG. 3B, the identified users 302A are depicted as a subset of the other users 302. As discussed, in some instances, the geographical area may be based on one or more of a distance to the first user, a travel time to the first user, an area code of the first user, a zip code of the first user, or a time zone of the first user, among other examples. In some aspects, the geographic area may be specified or otherwise indicated by the first user 301 in the post. In other aspects, the geographic area may be determined by the social network system 310.

Then, rather than transmitting the post only to the identified users 302A as described with respect to FIG. 3A, the example operation 300B of FIG. 3B continues with obtaining one or more ideologies, beliefs, or personal attributes of the first user 301. As discussed, in some aspects, users may provide their ideologies, beliefs, and personal attributes to the social network system 310 during user registration, and the social network system 310 may store the ideologies, beliefs, and personal attributes for each user in a corresponding user profile maintained in the profile data store 116A. In other aspects, the social network system 310 may obtain one or more of the ideologies, beliefs, and personal attributes of a respective user from sources external to the social network system 310. The personal attributes of a respective user may include one or more of an educational history of the respective user, a work history of the respective user, current or former employers of the respective user, current or former friends of the respective user, a current residence of the respective user, a hobby of the respective user, a special talent of the respective user, a distinguishing feature or birthmark of the respective user, a favorite interest of the respective user, a favorite song of the respective user, a favorite movie of the respective user, a favorite quote or joke of the respective user, or one or more characteristics, secrets, or facts pertaining to the first user 301 that are uniquely known to at least one of the identified users 302.

The correlation engine 122 can correlate one or more of the ideologies, beliefs, and/or personal attributes of the first user 301 with corresponding ideologies, beliefs, and/or personal attributes of the other users 302 to identify or determine similarities between the first user 301 and each of the other users 302. For example, in some instances, the correlation engine 122 can determine a correlation or level of similarity between one or more personal attributes of the first user 301 and one or more respective personal attributes of a group of other users 302. The personal attributes of a respective user may include (but are not limited to) comprise one or more an educational history, a work history, current or former employers, current or former friends, a current residence, a hobby, a special talent, a distinguishing feature or birthmark, a favorite interest, song, movie, quote, or joke, or one or more characteristics, interests, or facts pertaining to the first user that are uniquely known to at least one of the other users. For example, the correlation information may identify users who have similar or common work experiences, employers, job titles, and/or educational backgrounds. For another example, the correlation information may identify users who have similar or common hobbies, interests, and/or talents. For another example, the correlation information may identify users who have similar or common ideologies, beliefs, and/or affinities. In some instances, the correlation engine 122 can apply weights to one or more of the ideologies, beliefs, and/or personal attributes of the first user 301 and/or any one or more of the other users 302 when identifying or determining the similarities between the first user 301 and each of the other users 302. In some aspects, the weights may be dynamically adjustable by the social network system 310. In other aspects, the weights may be dynamically adjustable by the first user 301.

The correlation engine 122 may assign similarity scores to the identified users 302A based on their respective levels of similarity, and may select the identified users 302A who have a similarity score that is greater than a threshold score. Then, the social network system 310 may deliver the first user's post only to the selected users 302A' who have similarity scores that are greater than the threshold score. In the example of FIG. 3B, the selected users 302A' are depicted as a subset of the identified users 302A. Specifically, the social network system 310 transmits the post over the communications network 130 to only the computing devices associated with the selected users 302A'. These computing devices may present the post on their respective user interfaces for viewing by and/or interaction with the selected users 302A'. In this way, the social network system 310 may allow the first user's post to be received, viewed, and accessed only by the selected users 302A' who are located within the geographic area associated with the first user 301 and who have similarity scores that are greater than the threshold score.

If a selected user 302A' who views the first user's post wants to provide the goods and services sought by the first user 301, the selected user 302A' can generate a response to the post and transmit the response over the communications network 130 to the social network system 310. In various aspects, the social network system 310 forwards the response over the communications network 130 to computing device 101, which presents the response to the first user 301 via the user interface associated with the computing device 101. The response may be transmitted over the communications network 130 as a post, a message, an email, or any other suitable form of electronic communication that can be received by computing device 101 and presented for viewing by and/or interaction with the first user 301.

Figure 3C:
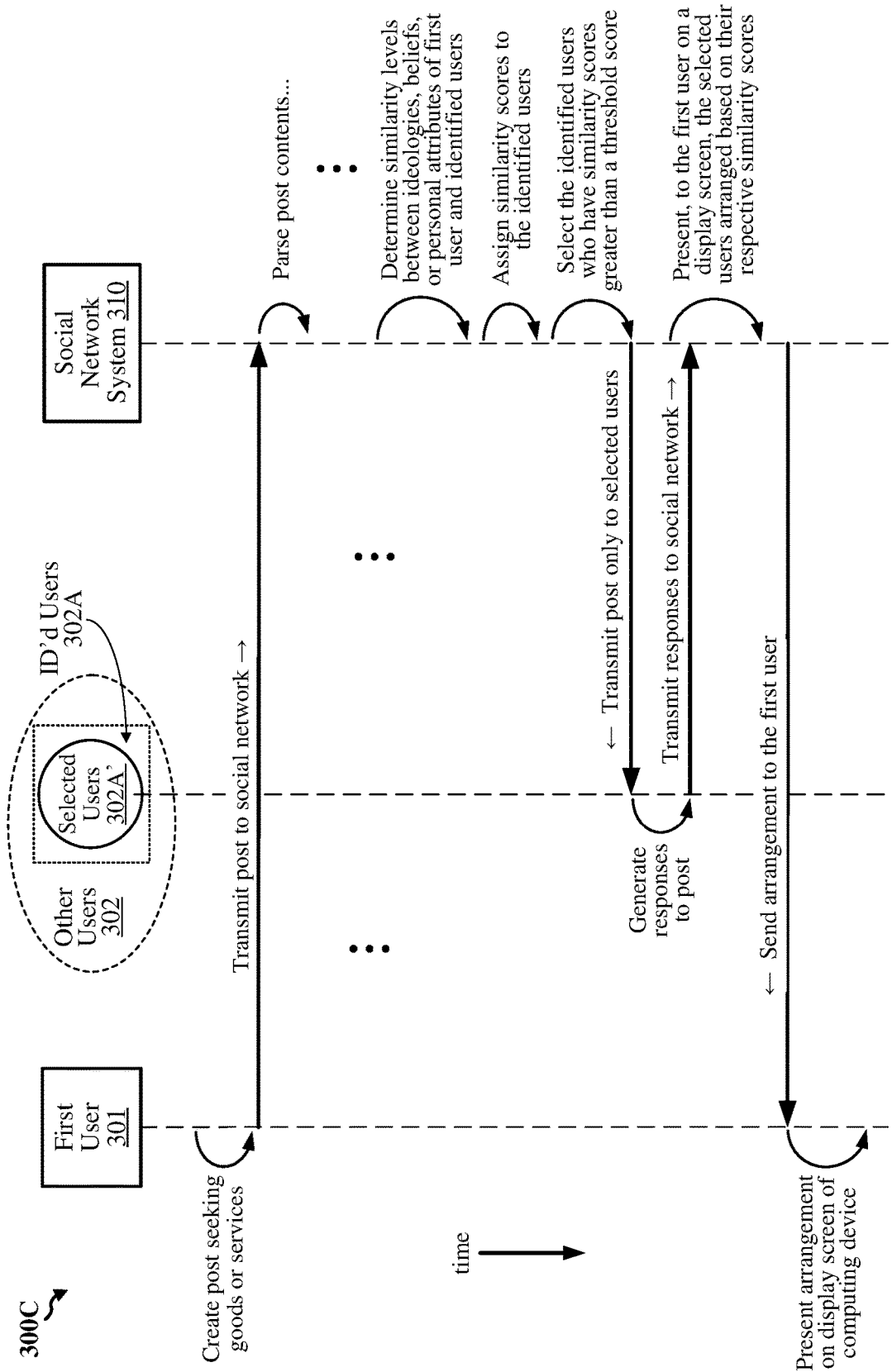
FIG. 3C shows a sequence diagram depicting an example operation for presenting selected users to a first user based on similarities between the first user and each of the selected users, according to some implementations.

FIG. 3C shows a sequence diagram depicting an example operation 300C for presenting selected users to a first user based on similarities between the first user and each of the selected users, according to some implementations. The example operation 300C may be performed between the first user 301 and the selected users 302A' of the social network system 310 described with respect to FIG. 3B. In some instances, the social network system 310 may be one example of the social network system 110 of FIG. 1 and may include one or more instances of the social network 124 of FIG. 1. As in the example of FIG. 3B, the operation 300C begins with the first user 301 creating the post in which the first user 301 seeks one or more goods or services that can be provided by other users 302 of the social network system 310. The operation 300C continues with the social network system 310 determining that the first user 301 seeks one or more goods or services from the other users 302, determining a location of the first user 301, and identifying the other users 302 of the social network system 310 who are located within the geographical area associated with the first user 301.

The social network system 310 determines a level of similarity between each of the one or more ideologies, beliefs, or personal attributes of the first user 301 and a corresponding ideology, belief, or personal attribute of each of the selected users 302A', assigns similarity scores to the identified users 302A based on their respective levels of similarity, and selects the identified users 302 whose similarity score is greater than the threshold score. The social network system 310 delivers the first user's post only to the selected users 302A' who have similarity scores that are greater than the threshold score. Specifically, the social network system 310 transmits the post over the communications network 130 only to the computing devices associated with the selected users 302A'. These computing devices may present the post on their respective user interfaces for viewing by and/or interaction with the selected users 302A'.

In the example of FIG. 3C, the social network system 310 arranges the selected users 302A' based on their respective similarity scores, and presents the arrangement of selected users 302A' on the display screen of the computing device 101 for viewing by the first user 301. In some instances, the arrangement may include a plurality of concentric rings of increasing diameter corresponding to a respective plurality of selected users 302A' and ordered based on their respective similarity scores. Specifically, the plurality of concentric rings may encircle a center area (e.g., similar to a "bullseye") corresponding to the first user 301, with the inner-most concentric ring corresponding to the selected user 302A' who has the highest similarity score, the next inner-most concentric ring corresponding to the selected user 302A' who has the next-highest similarity score, and so on, where the outer concentric ring corresponds to the selected user 302A' who has the lowest similarity score. In this way, the selected users 302A' can be presented to the first user 301 in a graphical format that can be quickly and easily discerned by the first user 301.

In other instances, the social network system 310 can present icons or selections on the display screen that allow the first user 301 to determine or select the manner in which the other users 302A are arranged or presented on the display screen. For example, a first icon may correspond to arranging the other users 302A on the display screen based on their similarity scores across a weighted group of attributes, and a second icon may correspond to arranging the other users 302A on the display screen based on their similarity scores across a one or more selected pairs of attributes. For another example, a third icon may correspond to displaying the other users 302A on the display screen, based on their similarity scores, as a spider graph or other display suitable for highlighting similarities (or differences) in various attributes between the first user 301 and each of the other users 302A. In some aspects, the arrangement presented on the display screen can include a plurality of arms that radially extend from a center portion of the display screen so that the first user 301 can quickly discern similarities (or differences) between the other users 302A based on, for example, respective radial distances from the center portion.

In other implementations, the correlation engine 122 associated with the social network system 310 can rank, position, or order the selected users 302A' based on their respective similarity scores using any suitable arrangement or graphic element. For example, the selected user 302A' who has the highest similarity score may be presented to the first user 301 at a first time and/or displayed most prominently, the selected user 302A' who has the next-highest similarity score may be may be presented to the first user 301 at a second time and/or displayed second-most prominently, and so on, where the selected user 302A' who has the lowest similarity score may be presented to the first user 301 at a last time and/or displayed least prominently. For another example, the selected users 302A' may be presented to the first user 301 as a list on the display screen of computing device 101. In some other instances, the selected users 302A' may be presented to the first user 301 using another suitable graphical representation.

Figure 4B:
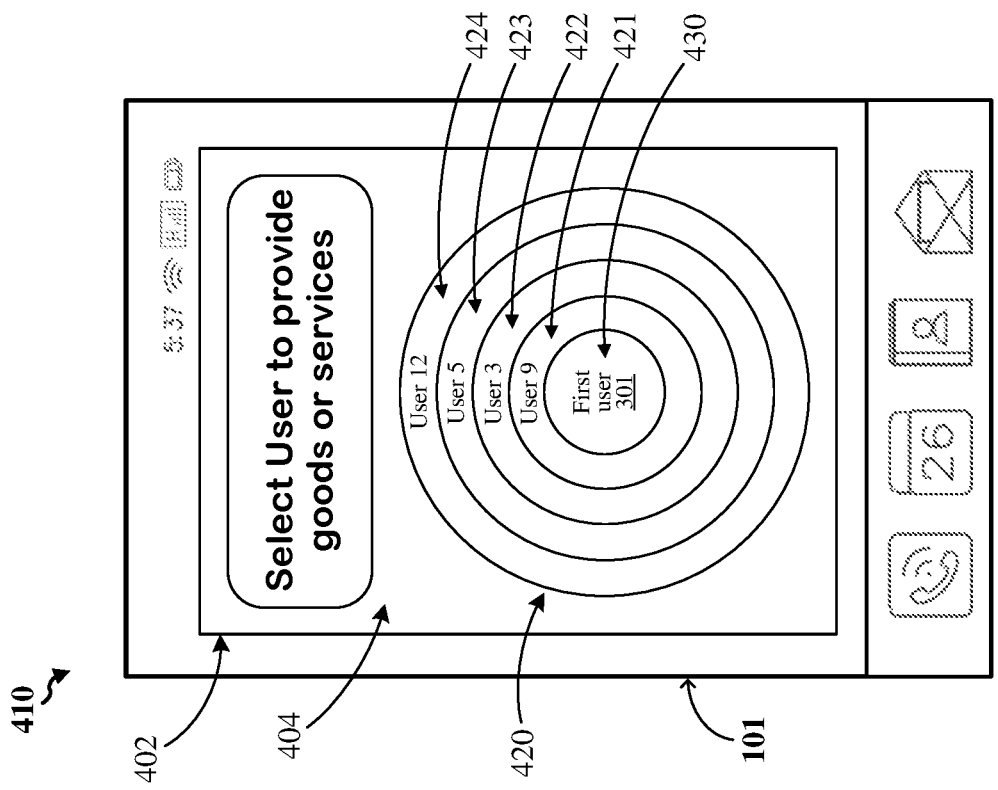
FIG. 4B shows an example screenshot of the first user's communication device depicting an arrangement in which a number of selected users are presented to the first user, according to some implementations.
Figure 4A:
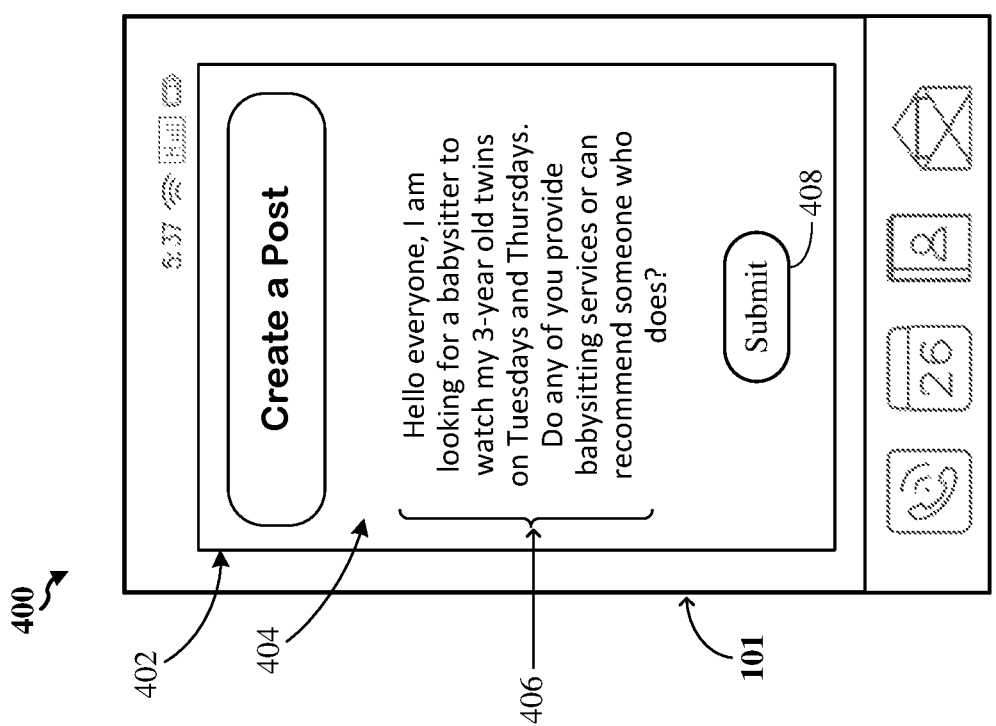
FIG. 4A shows an example screenshot of a communication device depicting a post in which a first user seeks goods or services from other users of a social network, according to some implementations.

FIG. 4A shows an example screenshot 400 of a display screen 402 of computing device 101, according to some implementations. As discussed, the computing device 101 is associated with the first user 301 described with reference to the operations 300A, 300B, and 300C of FIGS. 3A, 3B, and 3C, respectively. The display screen 402 may include or implement a user interface 404 of a browser or social network App that allows the first user 301 to create a post 406 indicating that the first user 301 seeks one or more goods or services from other users 302 of a social network associated with the social network system 310 of FIGS. 3A-3C. In the example of FIG. 4A, the post 406 indicates that the first user 301 is looking for a babysitter to watch the first user's 3-year old twins on Tuesdays and Thursdays. When the first user 301 is ready to submit the post 406, the first user 301 may press the "Submit" icon 408, and the computing device 101 transmits the post 406 over the communications network 130 to the social network system 310.

FIG. 4B shows an example screenshot 410 of the display screen 402 of computing device 101, according to other implementations. As discussed, the computing device 101 is associated with the first user 301 described with reference to the operations 300A, 300B, and 300C of FIGS. 3A, 3B, and 3C, respectively. The display screen 402 may include or implement the user interface 404 of the browser or social network App that allows the first user 301 to view content such as posts, comments, and responses to posts, among other examples. In the example of FIG. 4B, an arrangement 420 indicating the similarity scores of a selected group of users 302 relative to one another is presented in the user interface 404 of the display screen 402. In some instances, the arrangement 420 may indicate which of the selected users has the most in common with the first user 301, which of the selected users has the second-most in common with the first user 301, and so on.

Specifically, the arrangement 420 includes a plurality of concentric rings 421-424 of increasing diameters that encircle a center area 430. In some instances, the center area 430 corresponds to the first user 301 who wrote the post seeking the goods or services from the other users 302, the inner-most concentric ring 421 corresponds to User 9 who has the highest similarity score, the second inner-most concentric ring 422 corresponds to User 3 who has the second-highest similarity score, the third inner-most concentric ring 423 corresponds to User 5 who has the third-highest similarity score, and the outer-most concentric ring 424 corresponds to User 12 who has the lowest similarity score. In other instances, the arrangement 420 may indicate that User 9 may have the most in common with the first user 301, User 3 may have the second-most in common with the first user 301, User 5 may have the third-most in common with the first user 301, and User 12 may have the least in common with the first user 301. In this way, the first user 301 can use the arrangement 420 presented on the display screen 402 to quickly determine that User 9's ideologies, beliefs, and/or personal attributes are more similar to those of the first user 301 than the other selected users (e.g., User 3, User 5, and User 12).

Figure 5:
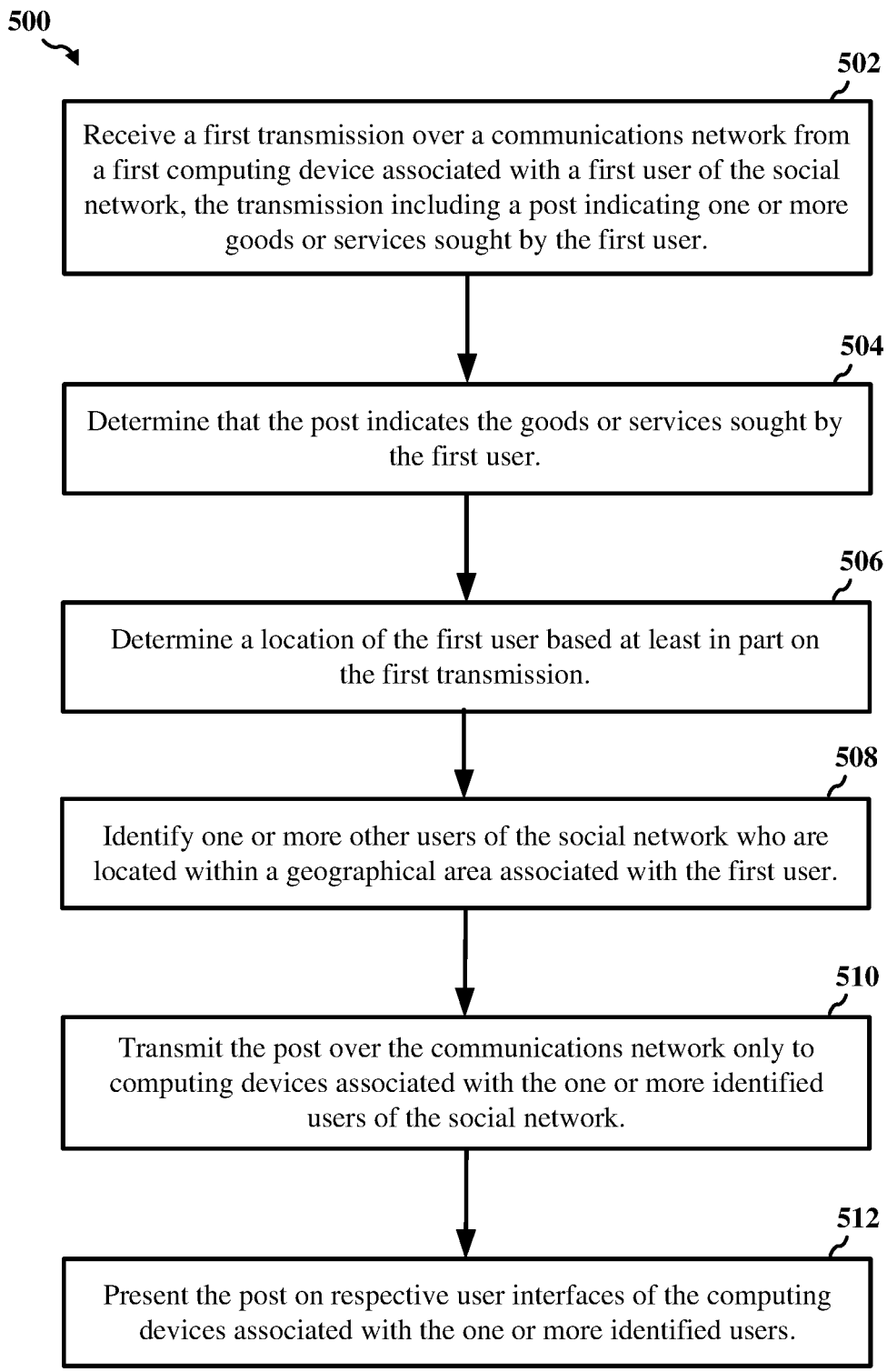
FIG. 5 shows an illustrative flowchart depicting an example operation for providing content on a social network, according to some implementations.

FIG. 5 shows an illustrative flowchart depicting an example operation 500 for providing user content on a social network, according to some implementations. The operation 500 may be performed by one or more processors associated with the social network system 110 of FIG. 1 or one or more processors associated with the social network system 310 of FIGS. 3A-3C. For example, at 502, the social network system 110 receives a transmission over a communications network from a first computing device associated with a first user of the social network, the transmission including a post indicating one or more goods or services sought by the first user. At 504, the social network system 110 determines that the post indicates the goods or services sought by the first user. At 506, the social network system 110 determines a location of the first user based at least in part on the first transmission. At 508, the social network system 110 identifies one or more other users of the social network who are located within a geographical area associated with the first user. At 510, the social network system 110 transmits the post over the communications network only to computing devices associated with the one or more identified users of the social network. At 512, the social network system 110 presents the post on respective user interfaces of the computing devices associated with the one or more identified users. The user interface may include one or more of a display screen, an audio interface, a virtual reality headset, an augmented reality headset, a digital assistant, or a haptic interface.

The location of a respective user can be based on the IP address of a computing device used by the respective user, positioning information of a mobile device used by the respective user to access the social network, or a location specified by the respective user. In some instances, the geographical area can be based on one or more of a distance from the first user, a travel time to the first user, an area code of the first user, a zip code of the first user, or a time zone of the first user. In some aspects, the geographical area may be specified by the first user. In other aspects, the geographical area may be selected by the social network system 110, for example, to ensure that the geographical area includes a minimum number of other users.

In various aspects, the post may be presented to the identified users via the user interfaces of their respective computing devices independently of an online marketplace associated with the social network system 110. In some instances, the first user's post may be presented to the identified users on the user interfaces of their respective computing devices in the same manner that other posts (e.g., posts that do not seek goods or services) are presented. For example, in some aspects, the post may be presented in a general feed, wall, or stream displayed to each of the identified users. Because online marketplaces can be loosely organized, prone to clutter, littered with advertisements, and cumbersome to navigate, the ability of the social network system 110 to present the first user's post to the identified users without using online marketplaces may increase the ease and convenience with which the identified users are able to receive and respond to user posts seeking goods or services from other users of the social network system 110, thereby increasing the likelihood that the first user receives response to his or her post.

Figure 6:
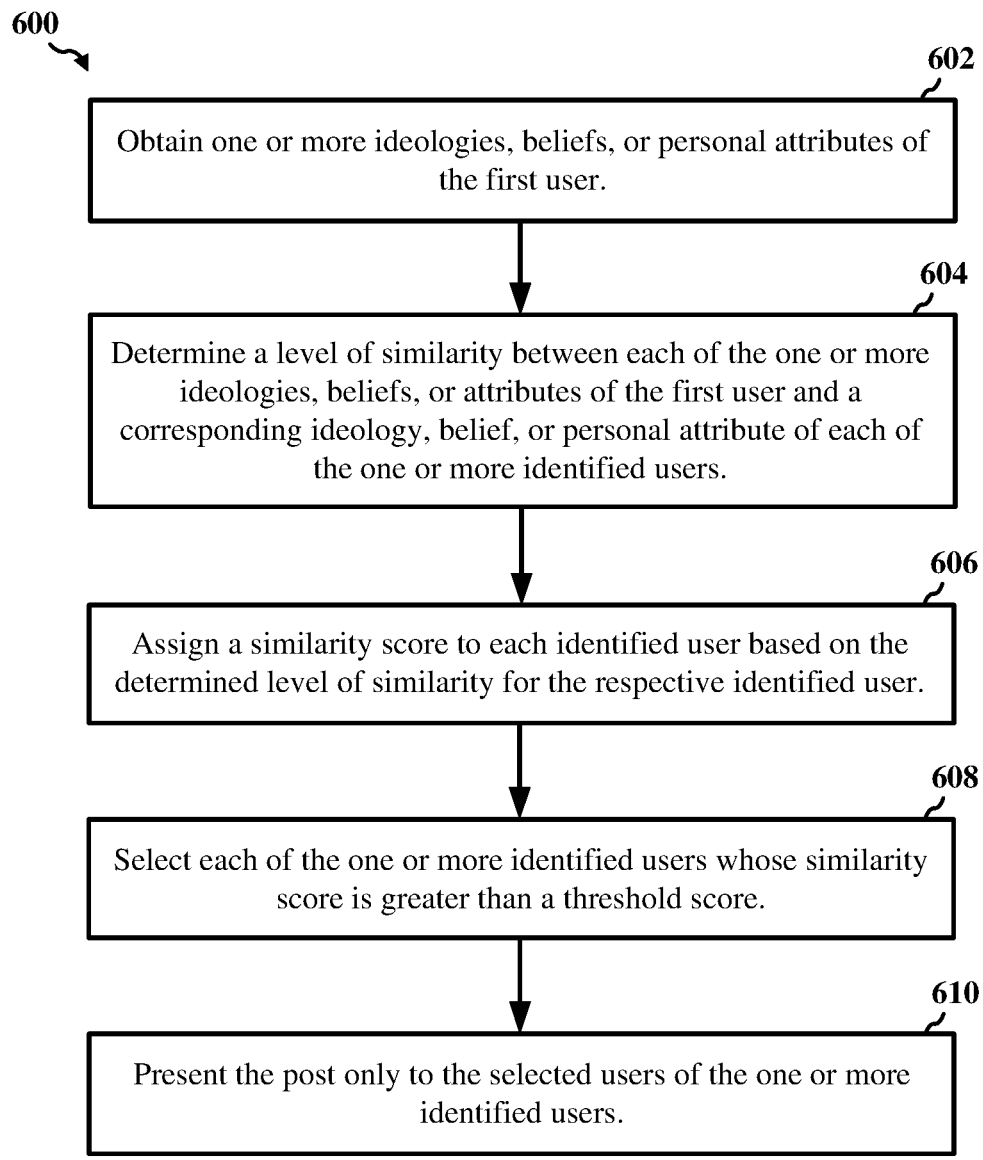
FIG. 6 shows an illustrative flowchart depicting another example operation for providing content on a social network, according to some implementations.

FIG. 6 shows an illustrative flowchart depicting another example operation 600 for providing user content on a social network, according to some implementations. The operation 600 may be performed by one or more processors of the social network system 110 of FIG. 1 or one or more processors associated with the social network system 310 of FIGS. 3A-3C. In some instances, the operation 600 may be performed in conjunction with the example operation 500 of FIG. 5. For example, at 602, the social network system 110 obtains one or more ideologies, beliefs, or personal attributes of the first user. At 604, the social network system 110 determines a level of similarity between each of the one or more ideologies, beliefs, or attributes of the first user and a corresponding ideology, belief, or personal attribute of each of the one or more identified users. At 606, the social network system 110 assigns a similarity score to each identified user based on the determined level of similarity for the respective identified user. At 608, the social network system 110 selects each of the one or more identified users whose similarity score is greater than a threshold score. At 610, the social network system 110 presents the post only to the selected users of the one or more identified users.

In some instances, the personal attributes may include one or more an educational history, a work history, current or former employers, current or former friends, a current residence, a hobby, a special talent, a distinguishing feature or birthmark, a favorite interest, song, movie, quote, or joke, or one or more characteristics, interests, or facts pertaining to the first user that are uniquely known to at least one of the identified users.

Figure 7:
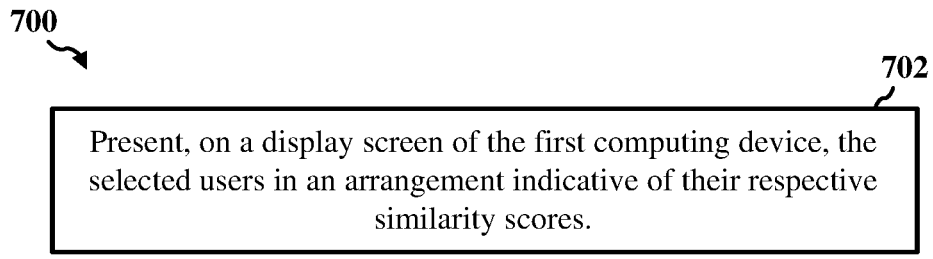
FIG. 7 shows an illustrative flowchart depicting an example operation for presenting selected users to a posting user based on similarities between the posting user and each of the selected users, according to some implementations.

FIG. 7 shows an illustrative flowchart depicting another example operation 700 for presenting selected users to a first user based on similarities between the first user and each of the selected users, according to some implementations. The operation 700 may be performed by one or more processors associated with the social network system 110 of FIG. 1 or one or more processors associated with the social network system 310 of FIGS. 3A-3C. In some instances, the operation 700 may be performed after the example operation 600 of FIG. 6. For example, at 702, the social network system 110 presents, on a display screen of the first computing device, the selected users in an arrangement indicative of their respective similarity scores. In some instances, the arrangement includes one or more concentric rings each corresponding to a respective selected user, the one or more concentric rings ordered based on the similarity scores of the respective selected users.

As used herein, a phrase referring to "at least one of" a list of items refers to any combination of those items, including single members. As an example, "at least one of: a, b, or c" is intended to cover: a, b, c, a-b, a-c, b-c, and a-b-c.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The various illustrative logics, logical blocks, modules, circuits, and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, or any conventional processor, controller, microcontroller, or state machine. A processor also may be implemented as a combination of computing devices such as, for example, a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein but are to be accorded the widest scope consistent with this disclosure, the principles and the novel features disclosed herein.

What is claimed is:

1. A method for providing user content on a social network, the method performed by one or more processors of a server hosting the social network and comprising:
   receiving a transmission over a communications network from a first computing device associated with a first user of the social network, the transmission including a post indicating one or more goods or services sought by the first user;
   determining a location of the first user based at least in part on the received transmission;
   identifying one or more other users of the social network who are located within a geographical area associated with the first user;
   transmitting the post over the communications network only to computing devices associated with the one or more identified users of the social network;
   determining a level of similarity between one or more ideologies, beliefs, or personal attributes of the first user and a corresponding ideology, belief, or personal attribute of each of the one or more identified users; and
   presenting, on a display screen of the first computing device, the one or more identified users in an arrangement of one or more concentric rings ordered based on the similarity scores of the respective selected users.

2. The method of claim 1, further comprising:
   presenting the post on respective user interfaces of the computing devices associated with the one or more identified users.

3. The method of claim 2, wherein the post is presented on the respective user interfaces of the computing devices independently of an online marketplace associated with the social network.

4. The method of claim 1, further comprising:
   assigning a similarity score to each of the one or more identified users based on the determined level of similarity for the respective identified user;
   selecting each of the one or more identified users whose similarity score is greater than a threshold score; and
   presenting the post only to the selected users of the one or more identified users.

5. The method of claim 4, wherein the personal attributes include one or more an educational history, a work history, current or former employers, current or former friends, a current residence, a hobby, a special talent, a distinguishing feature or birthmark, a favorite interest, song, movie, quote, or joke, or one or more characteristics, interests, or facts pertaining to the first user that are uniquely known to at least one of the identified users.

6. The method of claim 1, wherein the geographical area is based on one or more of a distance to the first user, a travel time to the first user, an area code of the first user, a zip code of the first user, or a time zone of the first user.

7. The method of claim 1, wherein the geographical area includes a minimum number of other users.

8. The method of claim 1, wherein the geographical area is specified by the first user.

9. The method of claim 1, wherein the location of a respective identified user is based on an IP address of the computing device associated with the respective identified user, positioning information of a mobile device used by the respective identified user to access the social network, or a location specified by the respective identified user.

10. A system for providing user content on a social network, the system comprising:
    one or more processors; and
    a memory communicatively coupled with the one or more processors and storing instructions that, when executed by the one or more processors, causes the system to:
       receive a transmission over a communications network from a first computing device associated with a first user of the social network, the transmission including a post indicating one or more goods or services sought by the first user;
       determine a location of the first user based at least in part on the transmission;

identify one or more other users of the social network who are located within a geographical area associated with the first user;

transmit the post over the communications network only to computing devices associated with the one or more identified users of the social network;

determine a level of similarity between one or more ideologies, beliefs, or personal attributes of the first user and a corresponding ideology, belief, or personal attribute of each of the one or more identified users; and present, on a display screen of the first computing device, the one or more identified users in an arrangement of one or more concentric rings ordered based on the similarity scores of the respective selected users.

11. The system of claim 10, wherein execution of the instructions further causes the system to:

present the post on respective user interfaces of the computing devices associated with the one or more identified users.

12. The system of claim 11, wherein the post is presented on the respective user interfaces of the computing devices independently of an online marketplace associated with the social network.

13. The system of claim 10, wherein execution of the instructions further causes the system to:

assign a similarity score to each of the one or more identified users based on the determined level of similarity for the respective identified user;

select each of the one or more identified users whose similarity score is greater than a threshold score; and present the post only to the selected users of the one or more identified users.

14. The system of claim 10, wherein the geographical area is based on one or more of a distance from the first user, a travel time to the first user, an area code of the first user, a zip code of the first user, or a time zone of the first user.

15. The system of claim 10, wherein the geographical area includes a minimum number of other users.

16. The system of claim 10, wherein the location of a respective identified user is based on an IP address of a corresponding computing device associated with the respective identified user, positioning information of a mobile device used by the respective identified user to access the social network, or a location specified by the respective identified user.

* * * * *